Jan. 31, 1967  C. DOYER  3,301,383
TROUGH-SHAPED CONVEYOR BELT
Filed Aug. 2, 1965
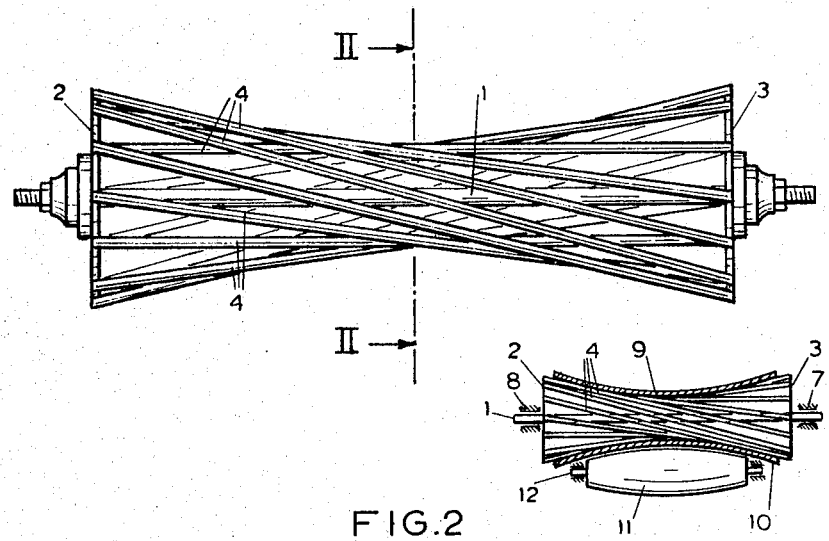
FIG.1
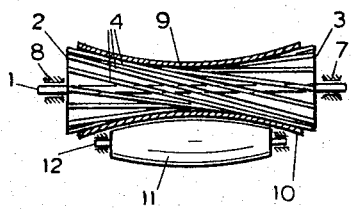
FIG.2  FIG.5
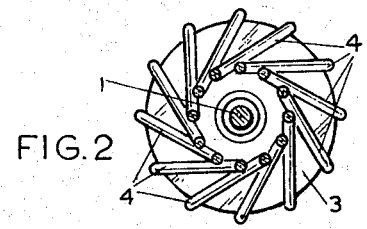
FIG.2
 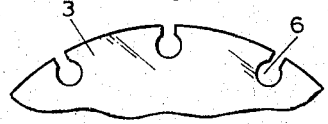
FIG.3  FIG.4
INVENTOR
CORNELIS DOYER
BY
ATTORNEY 3,301,383
TROUGH-SHAPED CONVEYOR BELT
Cornelis Doyer, Wladimirlaan 6a, Bussum, Netherlands
Filed Aug. 2, 1965, Ser. No. 476,280
Claims priority, application Netherlands, Aug. 5, 1964,
64/08954
5 Claims. (Cl. 198—192)

This invention relates to a trough-shaped conveyor belt borne by rollers at a number of spaced points. The object of the invention is to provide a conveyor belt of this kind of simple construction and with various other advantages. To this end, according to the invention, the belt is supported over its entire width at the supporting places by a single roller in the form of a hyperboloid of revolution. With such a construction, therefore, there is no longer any need for three rollers per supporting place, such rollers requiring accurate adjustment with respect to one another and with risk of fouling of bearings situated beneath the belt. With a single roller of hyperbolic shape there is also a certain slip of the belt with respect to the roller and this slip can be used to obtain a self-cleaning effect for the belt. The roller also automatically has a centering effect on the belt.

In one advantageous embodiment, the hyperboloid of revolution is formed by a number of straight rods all of which cross the roller shaft at the same angle and at the same distance. With such a construction an extremely good cleaning effect is obtained while production is very inexpensive.

According to the invention, the rods may be secured at the ends in radial flanges directed transversely of the shaft. With this construction the bearings may be disposed on the outside of the flanges so that they are all outside the range of any material falling from the belt.

In a very simple embodiment, the rods may be made slightly elastic and the ends may be provided with projections which are supported against the edges of keyhole-shaped slots in the peripheral part of the radial flanges. With such a construction the rods can very readily be fitted and replaced as necessary.

According to the invention, the rods may be made of plastics. The required elasticity is then obtained automatically while they are also very resistant to the action of corrosive materials.

In a very advantageous embodiment, at the place where one or more rollers support the top part of the belt the bottom part thereof is pressed against the underside of the roller by one or more additional rollers.

Because of the uneven diameter of the bearer roller a scraping effect is then exerted on the upperside of the bottom part of the belt while a lateral movement is also transmitted to the material scraped off the belt. This gives intensive cleaning of the inside of the belt.

The invention will be explained in detail with reference to the following exemplified embodiment and the drawing, wherein:

FIG. 1 is a side elevation of a roller of a belt according to the invention.

FIG. 2 is a cross-section of the belt in FIG. 1 on the line II—II.

FIG. 3 shows a special construction of the rod end.

FIG. 4 is a detail of the bearer roller flange.

FIG. 5 is a cross-section of the conveyor belt in a special embodiment.

The roller illustrated in FIGS. 1 and 2 consists of a shaft 1 provided with transversely extending circular flanges 2 and 3 near its ends. Rods 4 are welded to the edges of the flanges and all these rods enclose the same angle with the shaft 1 and are situated at equal distances from said shaft. The rods 4 form a regular surface in the form of a hyperboloid of revolution.

FIG. 3 shows a detail of a different embodiment of a rod 4. In this case the rod 4 has a thickened portion 5 at the end. With such a construction of the rod 4, the flanges 2 and 3 are formed with keyhole-shaped slots 6 as shown in FIG. 4. If the rods 4 are stretched slightly they can be pushed through the narrow part of the slot. If the rods are then released the thickened portions 5 will come to rest in the round parts of the slots 6.

FIG. 5 shows a conveyor belt in cross-section. The bearer roller construction is the same as that shown in FIGS. 1 and 2. The shaft 1 of the roller is supported at each end in bearings 7 and 8. The actual belt is denoted by reference 9 at the top part and reference 10 at the bottom part. The top part 10 is also pressed against the bearer roller by means of a barrel-shaped roller 11 mounted for rotation about a pivot 12.

When the belt is in operation the linear speed of the belt parts 9 and 10 is the same throughout. The circumferential speed of the bearer roller, however, depends upon the roller diameter. There will therefore be a relative movement of the rods 4 with respect to the inside surface of the belt parts 9 and 10 so as to exert a scraping effect on the belt parts. Since the rollers are of open construction no deposits can form on the roller and any material is removed from the belt.

In the case of corrosive materials, particularly hygroscopic materials, caking will gradually occur on the inside of the bottom part. Such caking is very effectively counteracted in the conveyor belt construction shown in FIG. 5.

What I claim:
1. A trough-shaped conveyor comprising a belt supported by a plurality of spaced rollers, said belt being supported over its entire width by each of said rollers, and each roller including a shaft and a belt supporting portion having the configuration of a hyperboloid of revolution formed by a plurality of straight rods all of which cross the roller shaft at the same angle and at the same distance.

2. A conveyor belt according to claim 1, wherein the ends of the rods are secured in radial flanges extending transversely of the shaft.

3. A conveyor belt according to claim 2, wherein the rods are slightly elastic and the ends are provided with projections which are supported against the edges of keyhole-shaped slots in the peripheral part of the radial flanges.

4. A conveyor belt according to claim 3, wherein the rods are of synthetic plastic.

5. A conveyor belt according to claim 1, wherein at least one of said rollers support the top part of the belt, and an additional roller presses the bottom part of the belt against the underside of said roller.

References Cited by the Examiner
UNITED STATES PATENTS
780,145   1/1905   Vaughan _____ 198—192
2,916,064  12/1959  Gaitten _____ 198—109

EVON C. BLUNK, Primary Examiner.
RICHARD E. AEGERTER, Examiner.